United States Patent
Ljøsne et al.

(10) Patent No.: US 10,495,216 B2
(45) Date of Patent: Dec. 3, 2019

(54) INTERROCKER ASSEMBLY

(71) Applicant: Kongsberg Automotive AS, Kongsberg (NO)

(72) Inventors: Knut Tore Ljøsne, Oslo (NO); Bjørn Iversen, Kongsberg (NO)

(73) Assignee: Kongsberg Automotive AS, Kongsberg (NO)

( * ) Notice: Subject to any disclaimer, the term of this patent is extended or adjusted under 35 U.S.C. 154(b) by 302 days.

(21) Appl. No.: 15/416,662

(22) Filed: Jan. 26, 2017

(65) Prior Publication Data
US 2018/0209536 A1    Jul. 26, 2018

(51) Int. Cl.
| | |
|---|---|
| F16H 61/18 | (2006.01) |
| F16H 63/20 | (2006.01) |
| F16H 63/24 | (2006.01) |
| F16H 63/28 | (2006.01) |
| F16H 63/34 | (2006.01) |
| F16H 63/36 | (2006.01) |

(52) U.S. Cl.
CPC .............. *F16H 61/18* (2013.01); *F16H 63/20* (2013.01); *F16H 63/24* (2013.01); *F16H 63/28* (2013.01); *F16H 63/3408* (2013.01); *F16H 63/36* (2013.01); *F16H 2061/185* (2013.01)

(58) Field of Classification Search
CPC .......... F16H 61/18; F16H 63/20; F16H 63/24; F16H 63/28; F16H 63/3408; F16H 63/36; F16H 2061/185
See application file for complete search history.

(56) References Cited

U.S. PATENT DOCUMENTS

| | | | |
|---|---|---|---|
| 3,643,520 A | * | 2/1972 | Andrushkiw ........... F16H 63/36 74/333 |
| 4,944,197 A | | 7/1990 | Stine et al. |
| 5,450,767 A | * | 9/1995 | Willford ................. F16H 59/70 340/456 |
| 5,546,825 A | | 8/1996 | Riley et al. |

(Continued)

FOREIGN PATENT DOCUMENTS

| | | | |
|---|---|---|---|
| GB | 1031400 A | * 6/1966 | ........... F16H 63/206 |
| GB | 1031400 A | 6/1966 | |

(Continued)

OTHER PUBLICATIONS

Machine-Assisted English translation of PCT Publication No. WO90/15272; downloaded from Espacenet.com; dated Jun. 11, 2018; 30 pages.

(Continued)

*Primary Examiner* — Zakaria Elahmadi
(74) *Attorney, Agent, or Firm* — Howard & Howard Attorneys PLLC

(57) ABSTRACT

An interrocker assembly for a transmission includes at least two shift forks for actuating gears in the transmission, each of the at least two shift forks being pivotal and having an end offset relative to each other, at least two actuators cooperating with the at least two shift forks, one of the at least two actuators cooperating with one of the at least two shift forks, and an interrocker being pivotally movable and cooperating with each of the at least two shift forks to securely prevent two gears from being engaged at the same time.

29 Claims, 4 Drawing Sheets

(56) References Cited

U.S. PATENT DOCUMENTS

| | | | | |
|---|---|---|---|---|
| 6,296,073 B1* | 10/2001 | Rioux | ............... | B60K 5/02 |
| | | | | 180/233 |
| 8,726,749 B2* | 5/2014 | Hirsch | ............... | F16D 23/14 |
| | | | | 74/335 |
| 2005/0223833 A1* | 10/2005 | Ewing | ............... | F16H 63/3009 |
| | | | | 74/473.1 |
| 2006/0266141 A1* | 11/2006 | Ogami | ............... | F16H 3/006 |
| | | | | 74/325 |
| 2006/0266147 A1* | 11/2006 | Bowen | ............... | F16H 63/20 |
| | | | | 74/473.1 |
| 2012/0304794 A1* | 12/2012 | Beer | ............... | F16H 63/3408 |
| | | | | 74/473.36 |
| 2015/0075308 A1* | 3/2015 | Enami | ............... | F16H 59/041 |
| | | | | 74/335 |
| 2015/0252898 A1* | 9/2015 | Wise, Jr. | ............... | F16H 63/38 |
| | | | | 74/473.25 |

FOREIGN PATENT DOCUMENTS

| | | | | |
|---|---|---|---|---|
| JP | 2007064472 A | * | 3/2007 | ............ F16H 63/36 |
| JP | 2007064472 A | | 3/2007 | |
| WO | 9015272 A1 | | 12/1990 | |

OTHER PUBLICATIONS

International Search Report of PCT/IB2018/050386; dated May 22, 2018; 14 pages.

* cited by examiner

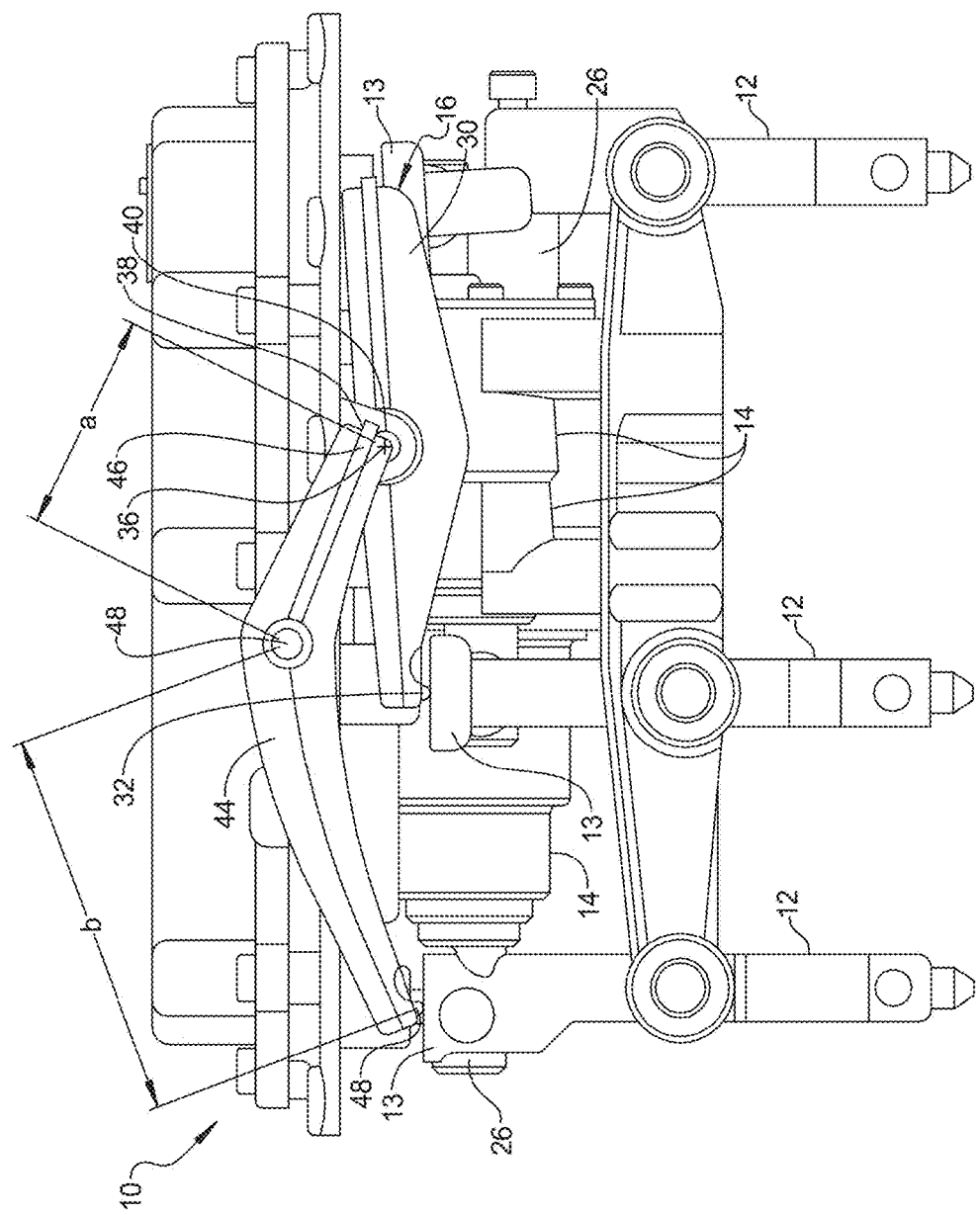

INTERROCKER ASSEMBLY

BACKGROUND OF THE INVENTION

1. Field of the Invention

The present invention relates generally to powertrains and, more particularly, to an interrocker assembly for a powertrain of a vehicle.

2. Description of the Related Art

It is known to provide an interlock between two shift rails for actuating components in a powertrain such as gears and clutches in a transmission. An example of such an interlock prevention device is disclosed in Japanese Patent Application Publication No. JP2007064472. In this patent publication, an interlock prevention device is provided for an automatic manual transmission, which can securely interlock at the time of shifting operation by utilizing actuator operation. The automatic manual transmission is provided with a plurality of actuators which are individually provided to a plurality of shift forks and which can individually operate the plurality of shift forks to move them linearly. With the actuation of one of the actuators, an interlock inhibiting mechanism, which is provided to the automatic manual transmission, regulates the actuation of at least one of the remaining actuators.

However, it is desirable to provide an interrocker to securely prevent two gears from ever being engaged at the same time. In addition, it is desirable to provide an interrocker for situations where two shift rails are not overlapping to allow a rocker arm to reach between two shift forks far apart from each other. In this situation, some manufactures use relatively longer actuators with a cross pin between the two rails that acts as an interlock. However, if shorter actuators are used, a simple cross pin design cannot be used to provide an interlock between two or more shift rails.

SUMMARY OF THE INVENTION

Accordingly, the present invention provides an interrocker assembly to provide an interlock between two or more shift rails when the rails/actuators are relatively short or not overlapping in length. The present invention also provides an interrocker or a twin interrocker to securely prevent two gears from ever being engaged at the same time.

In one embodiment, the present invention provides an interrocker assembly for a transmission including at least two shift forks for actuating gears in the transmission. Each of the at least two shift forks are pivotal and have an end offset relative to each other. The interrocker assembly also includes at least two actuators cooperating with the at least two shift forks, one of the at least two actuators cooperating with one of the at least two shift forks. The interrocker assembly further includes an interrocker being pivotally movable and cooperating with each of the at least two shift forks to securely prevent two gears from being engaged at the same time.

One advantage of the present invention is that a new interrocker assembly or interlock is provided between two shift forks or rails for a transmission. Another advantage of the present invention is that the interrocker assembly has a rocker arm that is hinged in the middle with each end interacting with a shift fork. Yet another advantage of the present invention is that the interrocker assembly allows the shift forks to have a structure so that if one shift fork is out of neutral (meaning in gear) the other shift fork cannot be moved out of neutral. Still another advantage of the present invention is that the interrocker assembly is achieved even on relatively short actuators not overlapping in length. A further advantage of the present invention is that an interrocker assembly is provided with twin rocker arms between more than two shift rails or forks when the rails/actuators are relatively short.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 4 is elevational view of another embodiment, according to the present invention, of the interrocker assembly of FIG. 1 illustrated in operational relationship with a powertrain.

DESCRIPTION OF THE PREFERRED EMBODIMENT(S)

Figure 1:
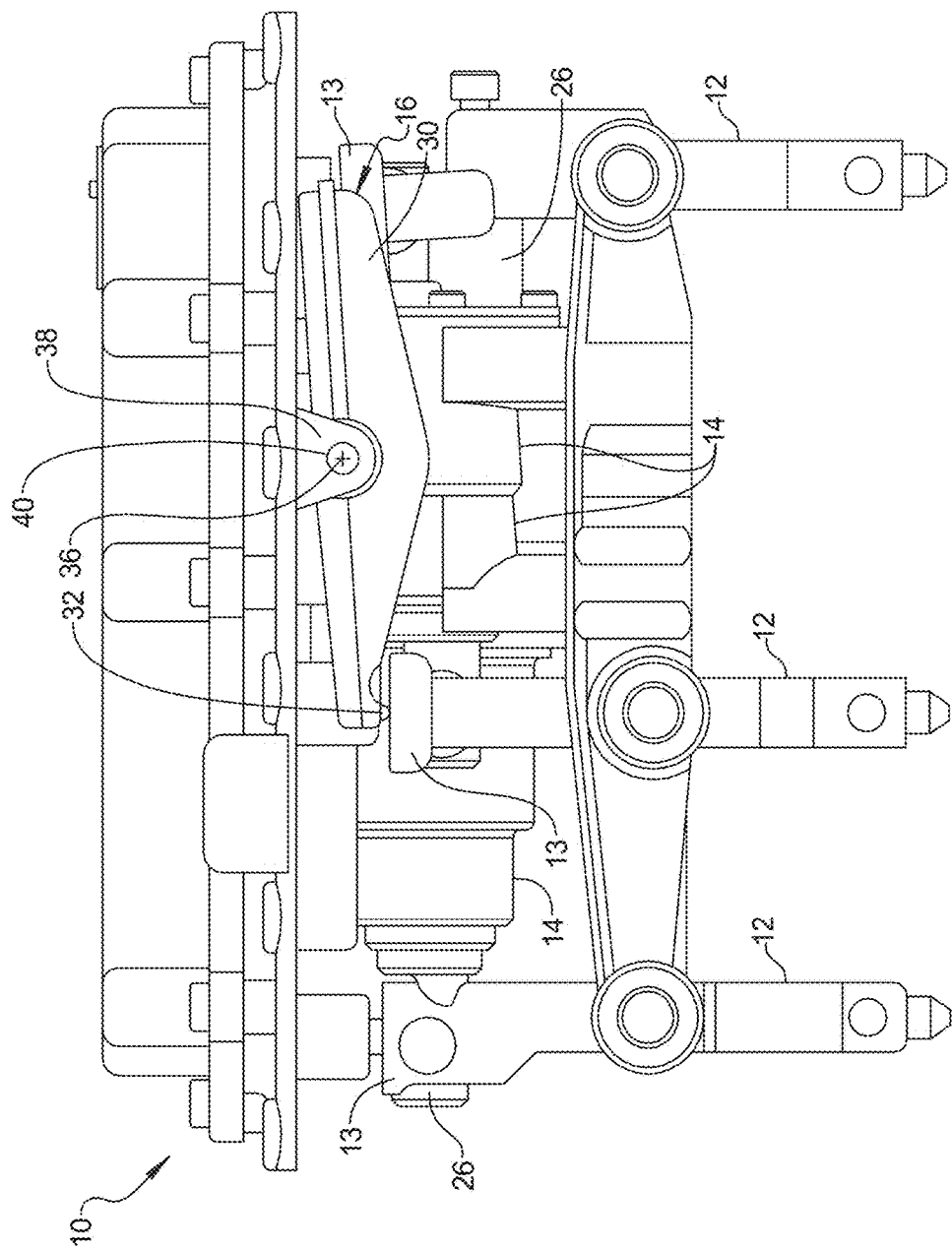
FIG. 1 is an elevational view of an interrocker assembly, according to one embodiment of the present invention, illustrated in operational relationship with a powertrain.
Figure 2:
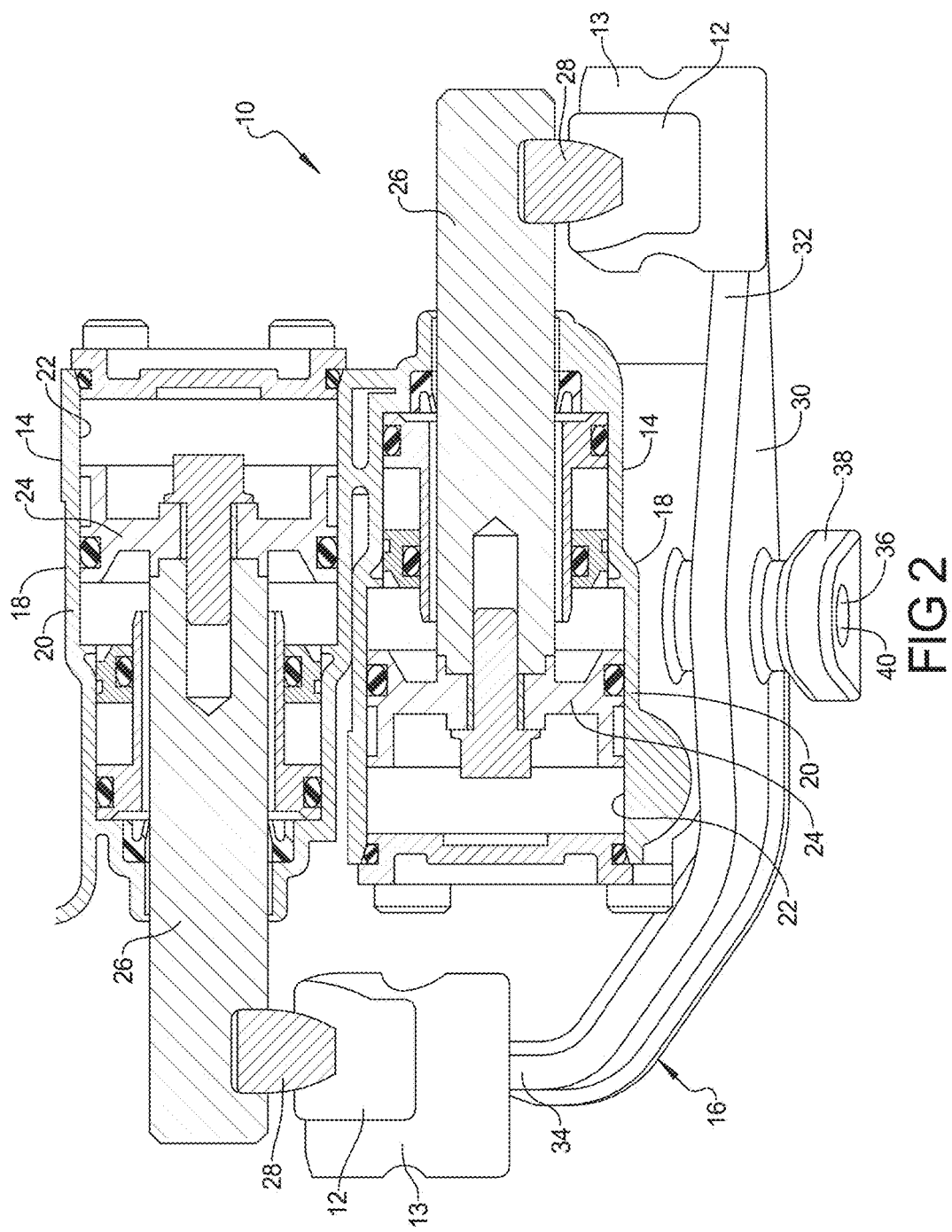
FIG. 2 is a cross-sectional view of a portion of the interrocker assembly of FIG. 1.
Figure 3:
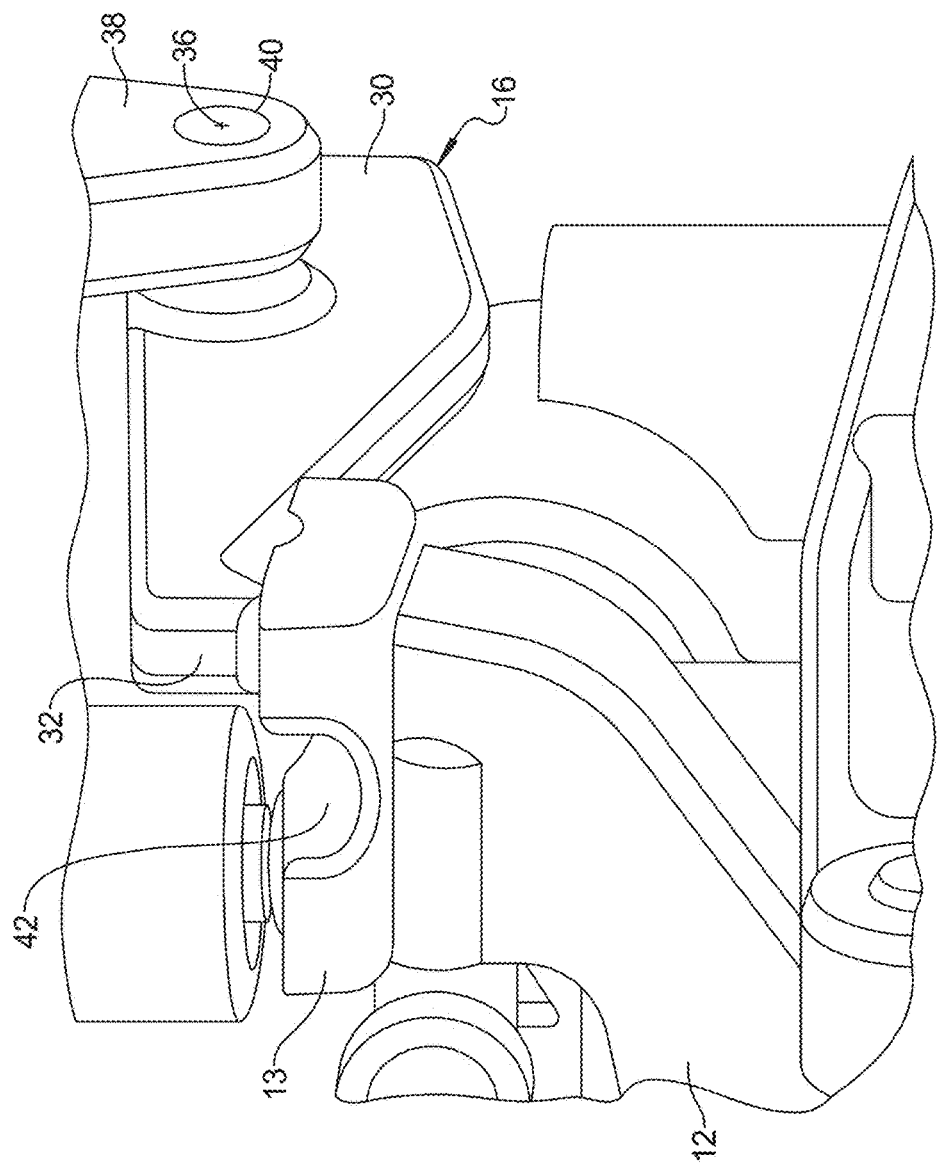
FIG. 3 is a perspective view of another portion of the interrocker assembly of FIG. 1.

As disclosed in FIGS. 1 through 3, one embodiment of an interrocker assembly 10, according to the present invention, is shown for moving components of a vehicle powertrain (not shown) such as gears and clutches in an automized transmission or an automatic manual transmission. It should be appreciated that the interrocker assembly 10 may be used to actuate other components such as clutches in other embodiments for the powertrain.

In the embodiment illustrated in FIG. 1, the interrocker assembly 10 includes two or more shift rails or forks 12 to engage and disengage two or more gears in the transmission. Each of the shift forks 12 are of a tilting type and are pivotal to engage and disengage the gears. Each of the shift forks 12 has an actuation or upper end 13 being offset relative to each other. The interrocker assembly 10 also includes two or more control cylinders or actuators 14 cooperating with the shift forks 12. As illustrated, one of the actuators 14 cooperates with one of the shift forks 12. The interrocker assembly 10 further includes an interrocker, generally indicated at 16, cooperating with the end 13 of at least two of the shift forks 12 to securely prevent two gears in the transmission from being engaged at the same time. It should be appreciated that the ends 13 of the shift forks 12 do not overlap or axially align relative to each other. It should also be appreciated that one shift fork 12 may be associated with two gears, depending on which way the shift fork 12 is moved.

Referring to FIG. 2, each of the actuators 14 includes a cylinder housing 18 extending axially. In one embodiment, the actuator 14 is of a single-acting type. The cylinder housing 18 is generally cylindrical in shape with a generally circular cross-section. The cylinder housing 18 has a wall 20 forming a chamber 22 therein. The cylinder housing 18 includes at least one opening or channel (not shown) extending therein and fluidly communicating with the chamber 22. It should be appreciated that the opening or channel allows fluid such as air from a source (not shown) to enter into the chamber 22. It should also be appreciated that the cylinder housing 18 may have any suitable shape and the opening or channel may be located at any suitable location.

The actuator 14 also includes a movable internal piston 24 disposed in the chamber 22. The piston 24 is generally cylindrical in shape. The piston 24 has a diameter less than a diameter of the cylinder housing 18 to allow the piston 24 to be movable linearly in the chamber 22 of the cylinder housing 18. The actuator 14 may include a piston rod 26 connected to and extending axially from the piston 24 for actuation of one of the shift forks 12 to tilt or pivot the shift fork 12. The actuator 14 includes a connector member 28 connected to the piston rod 26 external to the cylinder housing 18 to cooperate with one of the shift forks 12. It should be appreciated that, in contrast to the embodiment of a single-acting actuator 14, the actuator 14 can also be provided as a double-acting control cylinder or actuator 14, in which a further piston chamber for retraction of the piston rod 26 is provided in addition to the chamber 22 for extension of the piston rod 26. It should further be appreciated that valves for raising and lowering the pressure may also be provided for this further piston chamber.

Referring to FIGS. 1-3, the interrocker 16 includes a rocker arm 30 that cooperates with the end 13 of two of the shift forks 12 to securely prevent two gears of the transmission from being engaged at the same time. In the embodiment illustrated, the rocker arm 30 has one or a first end 32 and another or second end 34 offset from the first end 32. The rocker arm 30 is hinged to the transmission at a hinge point 36 disposed axially at a middle between each end 32, 34 with each end 32, 34 interacting with one of the shift forks 12. In one embodiment, the rocker arm 30 is hinged by a suitable mechanism such as a bracket 38 connected to the transmission and a fastener 40 extending through the rocker arm 30 and the bracket 38. Each of the ends 32, 34 moves along a sloped recess 42 in the end 13 of a corresponding one of the shift forks 12 to allow the rocker arm 30 to pivot. It should be appreciated that the rocker arm 30 is pivotally movable and hinged in the middle with each end 32, 34 interacting with a corresponding shift fork 12. It should also be appreciated that the rocker arm 30 may have a generally "U" shape with the hinge at the bottom of the U to allow one shift fork 12 to lock upwards and one shift fork 12 to lock downwards. It should further be appreciated that the rocker arm 30 may have any suitable shape.

In operation of the interrocker assembly 10, as illustrated in FIGS. 1-3, when one of the actuators 14 is actuated by fluid pressure, the actuator 14 moves or pivots one of the shift forks 12 from neutral to engage a gear in the transmission. When this occurs, the end 13 of the shift fork 12 moves relative to one of the ends 32, 34 of the rocker arm 30 and contact between one of the ends 32, 34 and the recess 42 of the end 13 of the shift fork 12 pivots the rocker arm 30 to prevent another shift fork 12 from being actuated by another actuator 14 from moving to engage a gear. It should be appreciated that if one of the shift forks 12 is out of neutral (meaning in gear) another one of the shift forks 12 cannot be moved out of neutral.

Referring to FIG. 4, another embodiment, according to the present invention, of the interrocker assembly 10 is shown. Like parts have like reference numerals. In this embodiment, the interrocker assembly 10 is of a twin interrocker type and includes a first rocker arm 30 and a second rocker arm 44 to allow for an interlock between more than two shift rails or forks 12, typically three shift rails or forks 12. In the embodiment illustrated, the second rocker arm 44 has one or a first end 46 and another or second end 48 offset from the first end 46. The second rocker arm 44 is hinged to the transmission at a hinge point 50 disposed axially between each end 46, 48. The hinge point 36 of the first rocker arm 30 is arranged at the end 46 of the second rocker arm 44 so that any movement of the first rocker arm 30 also translates to the second rocker arm 44. Further, the ratio of "b" and "a" on the second rocker arm 44 is 2:1 so that a uniform movement is achieved an all three shift forks 12. The same effect can be achieved with the second rocker arm 44 just resting on the first rocker arm 30, and the hinge point 50 fixed. It should be appreciated that the operation of the interrocker 10 is similar to that of FIGS. 2 and 3.

The present invention also provides a method of operating a transmission including the steps of providing at least two shift forks for actuating gears in the transmission, each of the at least two shift forks 12 having an end 13, and at least two actuators 14 cooperating with the at least two shift forks 12. The method also includes the steps of actuating one of the at least two actuators 14 to move one of the at least two shift forks 12 and pivotally moving an interrocker 16 to cooperate with each of the at least two shift forks 12 to securely prevent two gears from being engaged at the same time.

Accordingly, in the present invention, the shift forks 12 have a structure so that if one fork 12 is out of neutral (meaning in gear) the other fork 12 cannot be moved out of neutral. The interrocker assembly 10 of the present invention advantageously securely prevents two gears from ever being engaged at the same time. The interrocker assembly 10 of the present invention advantageously can be used for situations where two shift forks 12 are not overlapping, because the rocker arm 30 can reach between two shift forks 12 spaced far apart from each other.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. An interrocker assembly for a transmission comprising:
   at least two shift forks for actuating gears in the transmission, one of said at least two shift forks being pivotal about a first axis and another one of said at least two shift forks being pivotal about a second axis, said first axis and said second axis being in different planes and spaced from each other such that each of said at least two shift forks have an end offset relative to each other such that said end of each of said at least two shift forks are not axially aligned relative to each other;
   at least two actuators cooperating with the at least two shift forks, one of said at least two actuators cooperating with one of said at least two shift forks; and
   an interrocker being pivotally movable and cooperating with said end of each of said at least two shift forks to securely prevent two gears from being engaged at the same time.

2. An interrocker assembly as set forth in claim 1 wherein said interrocker comprises at least one rocker arm having one end cooperating with said end of one of said at least two shift forks.

3. An interrocker assembly as set forth in claim 2 wherein said at least one rocker arm has another end cooperating with said end of another one of said at least two shift forks.

4. An interrocker assembly as set forth in claim 2 wherein said at least one rocker arm is hinged to the transmission.

5. An interrocker assembly as set forth in claim 1 wherein said interrocker comprises a first rocker arm having one end cooperating with said end of one of said at least two shift forks and another end cooperating with said end of another one of said at least two shift forks.

6. An interrocker assembly as set forth in claim 5 wherein said first rocker arm is hinged to the transmission at a first hinge point.

7. An interrocker assembly as set forth in claim 6 wherein said interrocker comprises a second rocker arm being movable and having one end engaging with said end of yet another one of said at least two shift forks and another end engaging with said first hinge point of said first rocker arm.

8. An interrocker assembly as set forth in claim 7 wherein said second rocker arm is hinged to the transmission at a second hinge point.

9. An interrocker assembly as set forth in claim 8 wherein said second hinge point is fixed.

10. An interrocker assembly as set forth in claim 8 wherein said second hinge point between said one end and said another end of said second rocker arm is a ratio of 2:1.

11. An interrocker assembly for a transmission comprising:
two shift forks for actuating at least two gears in the transmission, one of said two shift forks being pivotal about a first axis and another one of said two shift forks being pivotal about a second axis, said first axis and said second axis being in different planes and spaced from each other such that each of said two shift forks have an end offset relative to each other such that said end of each of said two shift forks are not axially aligned relative to each other;
two actuators cooperating with said two shift forks, one of said two actuators cooperating with one of said two shift forks; and
an interrocker being pivotally movable and cooperating with said end of each of said two shift forks to securely prevent more than one of the at least two gears from being engaged at the same time.

12. An interrocker assembly as set forth in claim 11 wherein said interrocker comprises one rocker arm having one end cooperating with said end of one of said two shift forks.

13. An interrocker assembly as set forth in claim 12 wherein said one rocker arm has another end cooperating with said end of another one of said two shift forks.

14. An interrocker assembly as set forth in claim 12 wherein said one rocker arm is hinged to the transmission.

15. An interrocker assembly for a transmission comprising:
three shift forks for actuating at least three gears in the transmission, one of said three shift forks having a first axis, another one of said three shift forks having a second axis, and yet another one of said three shift forks having a third axis, said first axis, said second axis, and said third axis being in different planes and spaced from each other such that each of said three shift forks have an end such that said end of each of said three shift forks are not axially aligned relative to each other;
two actuators cooperating with two of said three shift forks, one of said two actuators cooperating with one of the two of said three shift forks; and
an interrocker being pivotally movable and cooperating with said end of each of said three shift forks to securely prevent more than one of the at least three gears from being engaged at the same time.

16. An interrocker assembly as set forth in claim 15 wherein said interrocker comprises a first rocker arm having one end cooperating with said end of one of said three shift forks and another end cooperating with said end of another one of said three shift forks.

17. An interrocker assembly as set forth in claim 16 wherein said first rocker arm is hinged to the transmission at a first hinge point.

18. An interrocker assembly as set forth in claim 17 wherein said interrocker comprises a second rocker arm being movable and having one end engaging with said end of yet another one of said three shift forks and another end engaging with said first hinge point of said first rocker arm.

19. An interrocker assembly as set forth in claim 18 wherein said second rocker arm is fixedly hinged to the transmission at a second hinge point.

20. A transmission comprising:
at least two shift forks for actuating gears, each of said at least two shift forks being pivotal about a first axis and another one of said at least two shift forks being pivotal about a second axis, said first axis and said second axis being in different planes and spaced from each other such that each of said at least two shift forks have an end offset relative to each other such that said end of each of said at least two shift forks are not axially aligned relative to each other;
at least two actuators cooperating with said at least two shift forks, one of said at least two actuators cooperating with one of said at least two shift forks; and
an interrocker being pivotally movable and cooperating with said end of each of said at least two shift forks to securely prevent two gears from being engaged at the same time.

21. A transmission as set forth in claim 20 wherein said interrocker comprises at least one rocker arm having one end cooperating with said end of one of said at least two shift forks.

22. A transmission as set forth in claim 21 wherein said at least one rocker arm has another end cooperating with said end of another one of said at least two shift forks.

23. A transmission as set forth in claim 21 wherein said at least one rocker arm is hinged to the transmission.

24. A transmission as set forth in claim 20 wherein said interrocker comprises a first rocker arm having one end cooperating with said end of one of said at least two shift forks and another end cooperating with said end of another one of said at least two shift forks.

25. A transmission as set forth in claim 24 wherein said first rocker arm is hinged to said transmission at a first hinge point.

26. A transmission as set forth in claim 25 wherein said interrocker comprises a second rocker arm being movable and having one end engaging with said end of yet another one of said at least two shift forks and another end engaging with said first hinge point of said first rocker arm.

27. A transmission as set forth in claim 26 wherein said second rocker arm is hinged to said transmission at a second hinge point.

28. A transmission as set forth in claim 27 wherein said second hinge point is fixed.

29. A method of operating a transmission, said method comprising the steps of:
providing at least two shift forks for actuating gears in the transmission, each of the at least two shift forks being pivotal about a first axis and another one of the at least two shift forks being pivotal about a second axis, the first axis and the second axis being in different planes and spaced from each other such that each of the at least two shift forks have an end offset relative to each other such that the end of each of the at least two shift forks are not axially aligned relative to each other, and at least two actuators cooperating with the at least two shift forks;

actuating one of the at least two actuators to move one of the at least two shift forks; and pivotally moving an interrocker to cooperate with the end of each of the at least two shift forks to securely prevent two gears from being engaged at the same time.

* * * * *